Aug. 31, 1965  J. N. URBANIK  3,204,148
CONTROL FOR ELECTROMAGNETIC COUPLING
Filed May 1, 1961  2 Sheets-Sheet 2
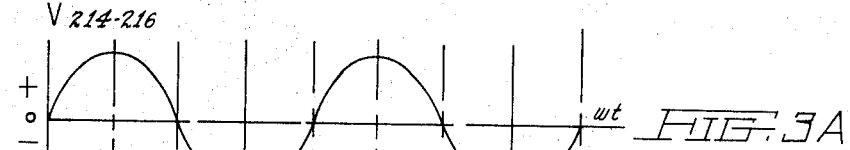
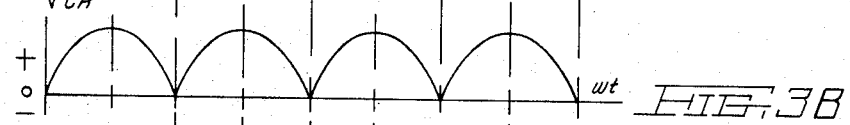
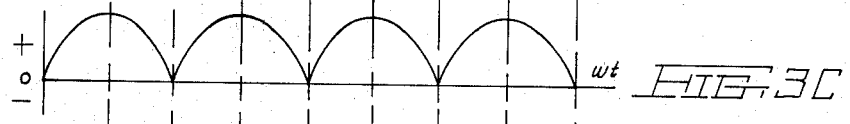
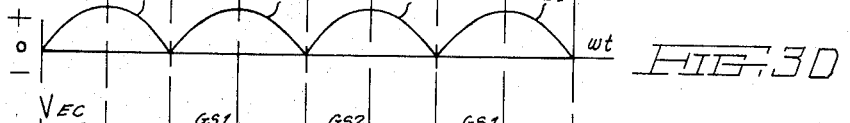
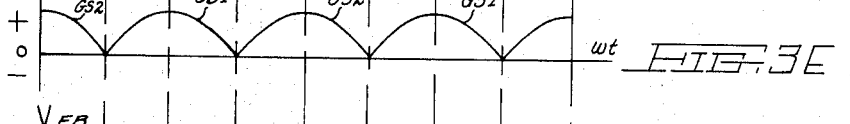
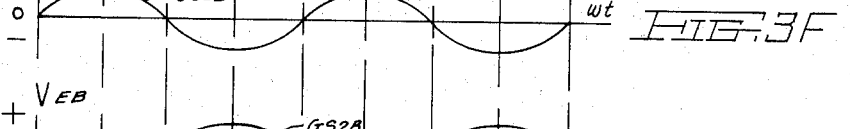
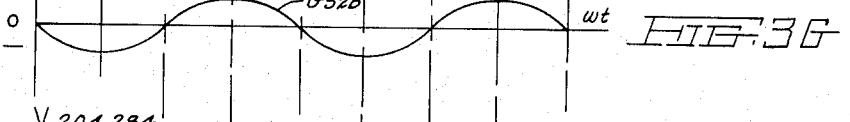
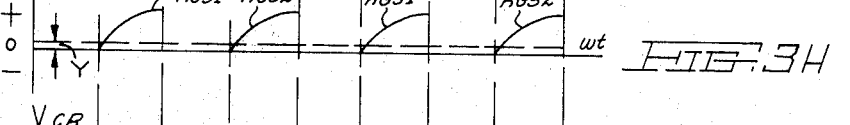
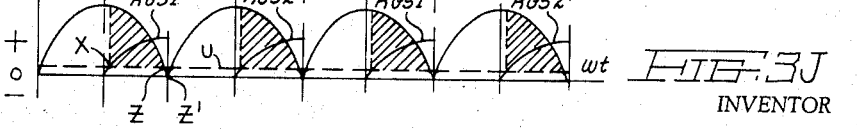
INVENTOR
JOSEPH N. URBANIK
BY
ATTORNEY

United States Patent Office 3,204,148
Patented Aug. 31, 1965

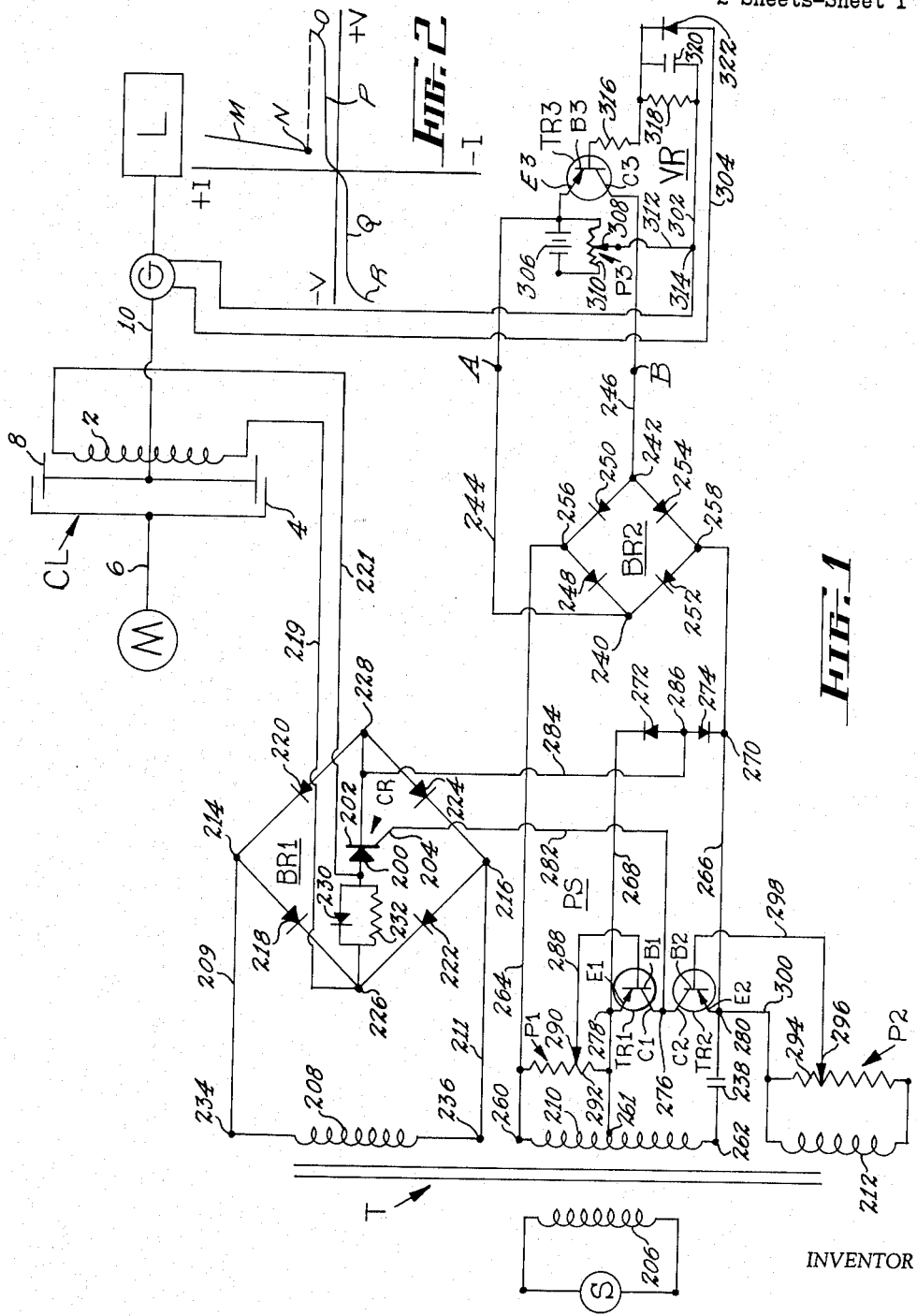

3,204,148
CONTROL FOR ELECTROMAGNETIC COUPLING
Joseph N. Urbanik, Kenosha, Wis., assignor to Eaton Manufacturing Company, Cleveland, Ohio, a corporation of Ohio
Filed May 1, 1961, Ser. No. 106,650
8 Claims. (Cl. 317—5)

This invention relates in general to an electrical control system and in particular to a speed control system for electromagnetic couplings.

A broad object of this invention is the provision of a speed regulating control system for electromagnetic couplings such as clutches, brakes, dynamometers, and the like.

A further object of this invention is to provide an electrical control system of the class described which includes a solid state controlled rectifier as a speed regulating device; the provision of a rugged control system incorporating rapid response.

A further object is the provision of a control system of the class described incorporating a full wave rectifier circuit employing only a single solid state controlled rectifier.

Other objects of the invention, characteristic features and advantages will be in part apparent and in part pointed out as the description progresses in conjunction with the circuitry shown in the following drawings:

FIG. 1 is a schematic diagram of the invention;
FIG. 2 illustrates a characteristic wave form of a typical solid state controlled rectifier; and
FIG. 3 is a configuration of wave forms directed to FIG. 1.

Referring now to FIG. 1, there is shown a full wave control circuitry utilizing a single solid state controlled rectifier CR, comprising an anode 200, a cathode 202 and a gate 204. The circuitry includes a transformer T having a primary winding 206 coupled to an A.C. voltage source S. Transformer T is shown to include three secondary windings, 208, 210 and 212, respectively. Secondary winding 208 is connected by means of leads 209 and 211 to points 214 and 216 of a single phase, full wave bridge rectifier circuit shown generally as BR1. The illustrated bridge rectifier circuit is utilized rather than a full wave center tap type to permit the use of a relatively small transformer and includes rectifiers 218, 220, 222, and 224 poled in such a direction so as to permit D.C. current flow through its associated load in one direction only.

The load is in the form of a field coil 2 of an electromagnetic device or the like and is connected in series by means of leads 219 and 221 to a single solid state controlled rectifier CR. The configuration is such to permit current flow through the field coil 2 from point 226 to point 228 regardless of the instantaneous polarities of the respective ends of secondary winding 208. The field coil is shown associated with a coupling output member 8 of an eddy current coupling CL. The output member 8 is coupled to an output shaft 10, a generator G, and a load L; the coupling also comprises a driving member 4 mechanically coupled to a motor M by a shaft 6. Generator G is preferably an A.C. permanent-magnet alternator.

A characteristic of the controlled rectifier, which may be of the silicon type, is such that it will block the flow of current through the field coil in series therewith unless its associated anode 200 is made positive with respect to its cathode 202, in addition, providing a positive gate signal is applied to its gate 204.

A rectifier 230 and a current limiting resistance 232 are shunted across field coil 2, rectifier 230 being poled in such a direction so as to permit the discharge of current from field coil 2 should secondary winding 208 become inactivated.

Assuming the induced voltage in the secondary winding is positive at point 234 with respect to point 236, conventional current will flow from point 234 to point 214 of the bridge circuit, through rectifier 218 to point 226, through field coil 2, controlled rectifier CR to point 228, through rectifier 224 to point 216 of the bridge rectifier and back to the negative side of secondary winding 208 at point 236. On the alternate half cycle, current flows through the field coil in the same direction but through rectifiers 222 and 220. The conduction paths and direction are such that the resulting current through the field coil and controlled rectifier is substantially that as shown in FIG. 3C illustrated as a full "on" condition.

The A.C. voltage signal induced in secondary winding 208 is seen at points 214 and 216 across bridge rectifier BR1 and is illustrated in FIG. 3A; FIG. 3B represents the full wave rectified voltage wave form across anode 200 and cathode 202 of the controlled rectifier CR.

To properly control the firing or activation of the controlled rectifier CR, the phase of the applied A.C. voltage gate signal must be appropriately shifted and this is accomplished by the phase shifting circuit shown generally at PS. This phase shifting circuit comprises a series connected secondary winding 210 of transformer T, a capacitor 238, and a variable impedance source, the input leads of which are identified as A and B. Points A and B are illustrated as connecting points for a variable resistance which may take the form of a standard variable resistor, a transistor, a transistor preamplifier circuit or the like.

For purposes of illustration, a variable resistance circuit VR is shown to include a feedback controlled transistor TR3 of the PNP type having its emitter E3 and collector C3 connected to points A and B, respectively. A D.C. source, illustrated as a battery 306, is included in the emitter-base circuit and a potentiometer P3, including a resistor 310 and a slider arm 308, is shunted thereacross. The emitter-base circuit is traced from emitter E3, a portion of resistor 310, arm 308, lead 312, point 314, lead 302 through resistor 318, current limiting resistor 316 and thence to base B3. With slider arm 308 positioned, for example, at a midpoint of potentiometer P3, base B3 is negative with respect to emitter E3 and a condition for conduction of TR3 is satisfied.

The generator feedback circuit is connected across resistor 318 and includes leads 302, 304, and a half wave rectifier, including rectifier 322 and a filter capacitor 320. The circuitry is chosen such that resistor 318 is common to both the emitter-base circuit and the feedback circuit and potentials developed across said resistor from both circuits are of opposite polarities. The resultant potential across resistor 318 controls the actuation of transistor TR3 and variation in the desired speed of shaft 10 may be controlled by adjustment of the potentiometer.

The emitter-collector circuit is connected from points A and B to points 240 and 242 of bridge rectifier BR2, comprising rectifiers 248, 250, 252, and 254, by means of leads 244 and 246, respectively.

Because of the bridge rectifier BR2 and the solid state device connected at A and B, points 256 and 258 no longer recognize this as a semi-conductive circuit but as a variable resistive source. For purposes of further explanation, the aforementioned variable resistive source is considered in a series relationship with capacitor 238 and secondary winding 210.

The above-mentioned series circuit is completed by connecting points 256 and 258 of said bridge rectifier to the respective end points 260 and 262 of secondary winding 210 in the phase shift circuit PS. Leads 264 and 266 form these connections, capacitor 238 being connected as shown between points 262 and 258. The upper and lower portions of secondary winding 210 are divided at point 261 by center tap lead 268 which forms a junction with lead 266 between capacitor 238 and bridge rectifier BR2 at point 270. Included in this connection are oppositely poled rectifiers 272 and 274.

Coupled across the lower portion of secondary winding 210 are interconnected semi-conductors TR1 and TR2. Said semi-conductors are illustrated as PNP transistors, each having an emitter, collector, and base, E1, C1, B1 and E2, C2 and B2, respectively. Said transistors are connected in an opposing relationship, having the respective collectors C1 and C2 coupled at junction 276 and their emitters E1 and E2 coupled to leads 268 and 266 at jnuctions 278 and 280, respectively.

The base-emitter circuit of transistor TR1 is coupled by means of lead 288 to a potentiometer P1 comprising a slider arm 290 and a resistor 292 shunted across the upper portion of secondary winding 210. Emitter E1 is connected to resistor 292 by means of lead 268.

To complete the base-emitter circuit of transistor TR2, a potentiometer P2, comprising a resistor 294 and a slider arm 296 is shunted across a third secondary winding 212 and base B2 is connected to said slider arm by means of lead 298. Emitter E2 is connected to resistor 294 via lead 300. Separate potentiometers P1 and P2 are utilized because of inherent characteristic variations of transistors TR1 and TR2; both potentiometers are preset to establish substantially equal bias conditions in the respective base-emitter circuits.

Because the solid state controlled rectifier has a characteristic known as "holding current," the use of only one controlled rectifier for full wave current conduction has been utilized. FIG. 2 illustrates this known characteristic plotted against voltage and current. Should current through the controlled rectifier drop below the minimum holding current N, the device will return to its forward blocking state P, thus preventing sustained conduction from one cycle to the other. FIG. 2 further illustrates high current conduction M, forward breakover voltage O, reverse blocking Q, and reverse avalanche breakdown R.

A phase shift control is employed in the circuit and the conduction point of the anode voltage cycle is controlled by the phase angle of a gate signal at gate 204; the circuitry utilizes full wave conduction and a unique means for controlling the gate signal.

The phase shift circuit PS, as previously explained, comprises a series connected RC circuit including a variable resistance seen between points 256 and 258, capacitor 238, and secondary winding 210. Since only one controlled rectifier is used in full wave conduction, the applied gate signal must be of proper polarity to each half cycle of the anode to cathode voltage impressed across the controlled rectifier. This is accomplished by utilizing two distinct gate circuits having a common path which prevents overlapping of the gate signal with the voltage signal across the controlled rectifier on alternate half cycles. The gate circuits may be considered as the phase shift output circuits.

The first gate signal circuit is traced from a point 261 connecting secondary winding 210 to the center tap lead 268, thence to the emitter-collector of transistor TR1, junction 276, lead 282, gate 204, lead 284 connected to the cathode side of controlled rectifier CR, junction 286, rectifier 274, and thence to junction 270. The second gate signal circuit is traced from junction 280, through the emitter-collector of transistor TR2, junction 276, lead 282, gate 204, lead 284 connected to the cathode side of controlled rectifier CR, junction 286, rectifier 272 and thence through center tap lead 268 to secondary winding 210 at point 261.

The first and second gate signal circuits are, therefore, both connected across the aforementioned series connected RC circuit and have common paths with the exception of alternately activated emitter-collector circuits of transistors TR1 and TR2, respectively.

The operation of FIG. 1 is as follows: With transformer T activated, motor M energized, and coupling member 4 rotating, the output coupling member 8, generator G, and load L will remain stationary due to the normal blocking characteristic of controlled rectifier CR. To energize field coil 2 and hence secure rotation of output member 8, a proper gate signal must be applied to the controlled rectifier.

The controlled rectifier is regulated by applying proper signals to the base-emitter circuits of transistors TR1 and TR2. Triggering the respective transistors at appropriate intervals controls the duration of conduction in the respective gate circuits, the gate signals will be of the same gate signals with the voltage signal impressed across the controlled rectifier. Because of the design of the respective gate circuits, the gate signals will be of the same polarity as the voltage applied to the controlled rectifier but will differ in phase by the amount of resistance seen in the RC circuit between points 256 and 258.

When a chosen amount of resistance is prevalent in the RC circuit, the first gate circuit is activated and a positive signal appears at gate 204 when the emitter of transistor TR1 is made positive with respect to its collector and its base is negative with respect to its emitter. This occurs, for example, when point 261 of secondary winding 210 is instantaneously positive with respect to point 262 and during this moment in time a portion of the A.C. signal across resistor 292 is applied of proper polarity to the base-emitter circuit of transistor TR1.

When point 261 is positive with respect to point 262, as above explained, transistor TR2 is non-conductive since the applied polarities of its emitter-collector and base-emitter circuits are improper. However, during the next half cycle, when point 262 is positive with respect to point 261, transistor TR2 is triggered to conduction, the second gate circuit is activated and transistor TR1 is in a non-conductive state. Since the polarity and phase of the gate signal has been achieved with respect to the applied voltage to the controlled rectifier, it now becomes necessary to control the conduction time of this signal. This is accomplished by controlling the phase shift of the gate signal with respect to the voltage applied across the controlled rectifier. In other words, the gate signal appearing in the emitter-collector circuits of transistors TR1 and TR2 is shifted toward an in-phase relationship with the respective base-emitter signals. The degree of phase shift is regulated in turn by the variable resistance circuit VR.

As further explained, gate signal wave forms GS1 and GS2 representing respective voltages of the emitter-collector circuits of transistors TR1 and TR2 are shown in FIG. 3D shifted 180° out of phase with the respective emitter-base bias wave forms GS1B and GS2B shown in FIGS. 3F and 3G, respectively. The 180° out-of-phase shift occurs when transistor TR3 is in a non-conductive state thereby offering maximum resistance in the RC circuit and a static condition of cut-off occurs.

Comparing the first full cycle wave forms of FIG. 3D with FIGS. 3F and 3G, it becomes apparent that the positive half cycles of GS1B and GS2B are completely out of phase with their respectively associated waves GS1 and GS2. Under this condition neither gate signal path is activated since the base-emitter circuits of the respective transistors are not triggered coincident in time with portions of the respective applied emitter-collector signals. Therefore, under this condition, controlled rectifier CR is held in a totally blocked state and current is prevented from flowing to field coil 2.

To trigger controlled rectifier CR, gate signals GS1 and GS2 must be shifted towards an in-phase relationship with the anode voltage of CR. An arbitrary shift of 90° showing this relationship is illustrated in FIG. 3E and is accomplished by reducing the resistance between points 256 and 258 of bridge rectifier BR2. This selected resistance is determined by the preselected conductive state of transistor TR3 which is proportional to the voltage signal applied to its base-emitter circuit.

Regulation of control has now been accomplished and by comparing shifted gate signals GS1 and GS2 in FIG. 3E with the respective bias signals GS1B and GS2B in FIGS. 3F and 3G, it is appreciated that a portion of the positive bias signal GS1B now coincides in time with a positive portion of gate signal GS1. This satisfies the condition for conduction of transistor TR1 and the resultant gate signal is illustrated as RGS1 in FIG. 3H. Likewise, RGS2, FIG. 3H, represents the resultant gate signal in the second gate signal path which includes transistor TR2.

The shaped portion of the voltage signal $V_{CR}$, FIG. 3J, represents conduction time of the controlled rectifier CR, commencing at point X which is triggered by the respective superimposed gate signals RGS1 and RGS2.

Because of the aforementioned "holding current" characteristics of the solid state controlled rectifier, the described circuitry, which utilizes only one controlled rectifier, lends itself to avoidance of sustained conduction from one cycle to the other. FIG. 3J illustrates an exaggerated showing of a "holding current" line U, below which the controlled rectifier returns to its forward blocking state. Without utilizing said characteristic, conduction of CR would terminate at point $Z^1$, rather than at point Z as shown, resulting in an undesirable possibility of sustained conduction to a succeeding cycle.

When field coil 2 becomes energized, output coupling 8, shaft 10, and generator G rotate in accordance with well known principles of the eddy-current art until the preselected speed is reached. The preselected speed is attained by adjusting potentiometer P3 to a desired setting which establishes a proper emitter-base signal across resistor 318 thereby activating transistor TR3 in the variable resistance circuit VR. The speed is goverened by the generator voltage circuit which includes a feedback voltage of opposite polarity developed by generator G across common resistor 318 proportional to the angular velocity of shaft 10. The speed of output member 8 will continue to increase until the generator feedback voltage substantially matches the preselected base-emitter voltage of TR3 and a mean condition is reached.

Sould the load decrease, output member 8 will have a tendency to increase its speed, thereby cutting off TR3, and the controlled rectifier will then have a tendency to cease conduction permitting output member 8 to reduce its speed such as to coincide with the pre-established speed set by potentiometer P3.

The above described circuitry, therefore, provides full wave rectification utilizing a single solid state controlled rectifier activated by two distinct gate circuits having a common path which are alternately controlled each half cycle by intercoupled separate semi-conductive circuits wherein the phase of said gate signal is axially shiftable with respect to the applied voltage across the controlled rectifier and wherein the phase shift circuit comprises an RC circuit including a speed responsive, feedback controlled semi-conductive device.

Unlike the control systems described in my copending application, Serial No. 106,649 filed May 1, 1961, the present invention accomplishes full wave control by utilizing only a single solid state controlled rectifier and eliminates the necessity of a reference voltage circut. Full wave control provides extremely accurate regulation since the controlled rectifier is being used to its full degree and is not at rest every half cycle. The rectification process is also more efficient since a higher percentage of the power supplied to the circuit is converted into the desired D.C. power.

In addition, the time constant is substantially decreased, resulting in faster response of electromagnetic couplings of the type described since the controlled rectifier characteristically acts as a resistance in series with the field coil.

Although generator G is described as an A.C. alternator, said alternator and its associated rectifier components may be replaced by a D.C. generator; likewise NPN type transistors may be substituted for the illustrated PNP types by changing the polarities of the power sources, etc.

It will be understood by those skilled in the art that various modifications of the invention may be made without departing from the spirit or scope of the invention.

What is claimed is:

1. A full wave electrical control for an electromagnetic coupling apparatus having a driven member, a driving member, a rotating shaft and a D.C. field coil, comprising a full wave bridge circuit including a solid state controlled rectifier, an A.C. voltage source connected to said bridge circuit, conductors connecting said field coil in series with said solid state controlled rectifier, means responsive to rotation of said shaft to supply a D.C. potential proportional to the angular velocity of said shaft, means including a variable resistance circuit responsive to said D.C. potential, a plurality of gate circuits each having a common path connected to said rectifier, said path connected to separate triggering means in each gate circuit for alternately applying gate signals to said rectifier, a phase shift circuit connected to said gate circuits and said resistant circuit means, whereby full wave rectification and energization of said field coil is responsive to activation of said rectifier.

2. A control as set forth in claim 1 in which said triggering means includes a transistor having its emitter-collector connected to said common path.

3. A control as set forth in claim 1 in which said phase shift means includes a variable RC circuit responsive to the angular velocity of said shaft.

4. A full wave electrical control for an electromagnetic coupling having a driven member, a driving member and a D.C. field coil, comprising a phase shift circuit means including a variable component responsive to the speed of said driven member, an A.C. voltage source and a solid state controlled rectifier connected to said field coil, said phase shift means connected to a plurality of gate circuit means each having a common path connected to said rectifier, means for alternately activating said gate circuit means whereby full wave energization of said field coil is controlled by the response of said rectifier to alternate activation of said gate circuit means.

5. A control as set forth in claim 4 in which each of said plurality of gate circuit means has a common path connected to a separately activated semi-conductive device.

6. A control as set forth in claim 5 in which each semi-conductive device includes an alternately biased transistor.

7. A control as set forth in claim 4 in which said phase shift means includes a variable RC circuit, said component forming a part of said RC circuit.

8. An electrical control for an electromagnetic device having a driving member, a driven member, a signal-generating speed-responsive device connected to the driven member and a field coil comprising a solid state controlled rectifier and a primary A.C. voltage source connected to said field coil, said rectifier having a gate, means for applying full wave rectified voltage signals to said rectifier, a plurality of gate circuits each having a common path connected to said gate and each connected to a secondary A.C. voltage source, means for applying gate signals to said gate by alternately activating each gate circuit on successive half-cycles of said secondary source, and a phase shift means for displacing said gate signals with respect to said voltage signals dependent upon a speed responsive signal from said speed-responsive device whereby full wave rectification and energization of said field coil is responsive to activation of said rectifier.

References Cited by the Examiner

UNITED STATES PATENTS

| | | | |
|---|---|---|---|
| 2,567,797 | 9/51 | Anderson | 323—106 |
| 2,668,921 | 2/54 | Lash | 317—5 |
| 2,897,428 | 7/59 | Wilkins | 322—79 |
| 2,977,523 | 3/61 | Cockrell | 323—22 |
| 3,095,534 | 6/63 | Cockrell | 321—40 X |

SAMUEL BERNSTEIN, *Primary Examiner.*

UNITED STATES PATENT OFFICE
CERTIFICATE OF CORRECTION

Patent No. 3,204,148　　　　　　　　　　　　　　　　August 31, 1965

Joseph N. Urbanik

It is hereby certified that error appears in the above numbered patent requiring correction and that the said Letters Patent should read as corrected below.

Column 2, line 1, after "202" insert -- and --; line 44, for "silder" read -- slider --; column 4, line 26, strike out ", the gate signals will be of the same" and insert instead -- thereby preventing overlapping the --; column 5, line 27, for "shaped" read -- shaded --; lines 31 and 32, for "characteristics" read -- characteristic --; line 57, for "Sould" read -- Should --.

Signed and sealed this 19th day of April 1966.

(SEAL)
Attest:

ERNEST W. SWIDER　　　　　　　　　　　　　　EDWARD J. BRENNER
Attesting Officer　　　　　　　　　　　　　　　　Commissioner of Patents